United States Patent [19]

Angell

[11] Patent Number: 4,693,438

[45] Date of Patent: Sep. 15, 1987

[54] ELECTRICAL BOX RETAINER

[76] Inventor: Thomas M. Angell, 324 S. Kentucky, Mason City, Iowa 50401

[21] Appl. No.: 827,426

[22] Filed: Feb. 10, 1986

[51] Int. Cl.⁴ .............................................. H02G 3/12
[52] U.S. Cl. .................................... 248/27.3; 174/58; 220/3.6; 248/DIG. 6; 248/231.8
[58] Field of Search .................. 248/27.1, 27.3, 231.8, 248/231.9, DIG. 6; 220/3.2, 3.3, 3.4, 3.5, 3.6 X, 3.9; 174/61, 63, 58, 53, 54; 24/456

[56] References Cited

U.S. PATENT DOCUMENTS

| | | | |
|---|---|---|---|
| 2,448,359 | 8/1948 | Davison | 220/3.6 |
| 2,454,119 | 11/1948 | Atkinson | 248/27 |
| 2,456,450 | 12/1948 | Sauter | 248/27.1 |
| 2,586,728 | 2/1952 | Shepard | 248/DIG. 6 |
| 2,658,704 | 11/1953 | Smith | 220/3.6 |
| 2,665,865 | 1/1954 | Bell | 248/DIG. 6 |
| 2,736,450 | 2/1956 | Atkinson | 220/3.4 |
| 2,751,173 | 6/1956 | Fredriksen | 248/DIG. 6 |
| 2,752,709 | 7/1956 | Gough | 248/231.8 |
| 2,800,698 | 7/1957 | Wood | 248/27.3 |
| 2,842,281 | 7/1958 | Chisholm | 220/3.6 |
| 2,888,684 | 6/1959 | Icenhower | 248/27.1 |
| 3,184,191 | 5/1965 | Esoldi | 220/3.6 |
| 3,268,189 | 8/1966 | Duchane | 248/27 |
| 3,424,332 | 1/1969 | Pimentel | 220/3.6 |
| 3,613,177 | 10/1971 | Davis | 248/27.3 |
| 3,860,139 | 1/1975 | French | 220/3.5 |
| 3,884,441 | 5/1975 | Barry | 248/DIG. 6 |
| 4,108,414 | 8/1978 | Grant, Sr. | 248/DIG. 6 |
| 4,180,226 | 12/1979 | Matte | 248/DIG. 6 |
| 4,183,486 | 1/1980 | Esoldi | 248/DIG. 6 |
| 4,226,393 | 10/1980 | Rardin | 248/205 R |

FOREIGN PATENT DOCUMENTS

| | | | |
|---|---|---|---|
| 535742 | 1/1957 | Canada | 174/58 |
| 688844 | 3/1953 | United Kingdom | 220/3.5 |

OTHER PUBLICATIONS

Erico Products Catalog, Cleveland, Ohio, "Caddy Metal Stud Clip", 1973, 4 pages.

Primary Examiner—Cornelius J. Husar
Assistant Examiner—Eric K. Nicholson
Attorney, Agent, or Firm—Henry C. Kovar

[57] ABSTRACT

A retainer for holding an electrical box in a wall is made of a single contiguous piece of almost dead soft thin sheet metal, the retainer has a folded over and flattened and work hardened nose, a two layer leading protusion, a divergent barb, an elongate shank, and a multiple purpose outward flange having a round heel and a grasping catch for receiving an insertion tool. A method of installing and retaining an electrical box has the steps of inserting the protrusion and barb, grasping the retainer and pulling it taunt, and driving an outer end into the electrical box. A method of making the retainer has the steps of shearing a rectangular piece of soft metal, forming a barb, folding over a first end and the barb, and forming a catch for an insertion tool on a second end.

4 Claims, 4 Drawing Figures

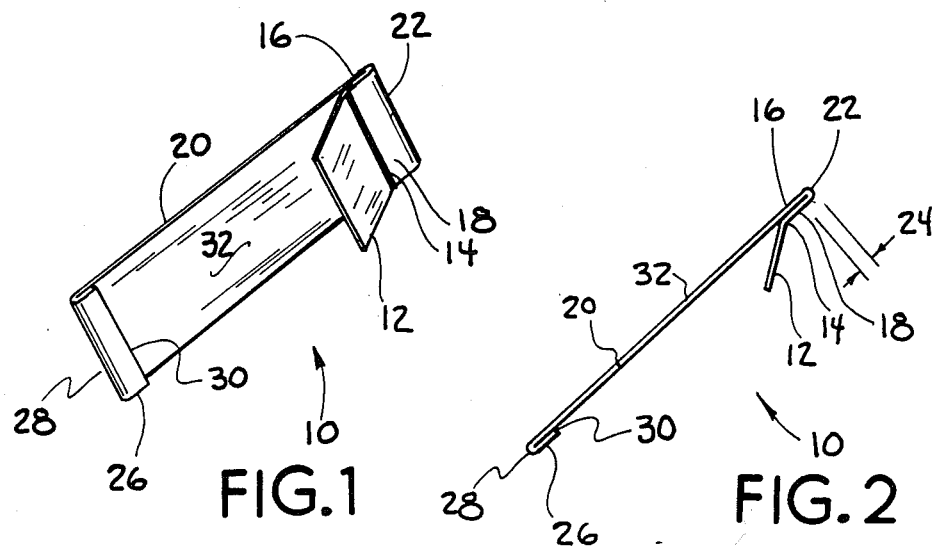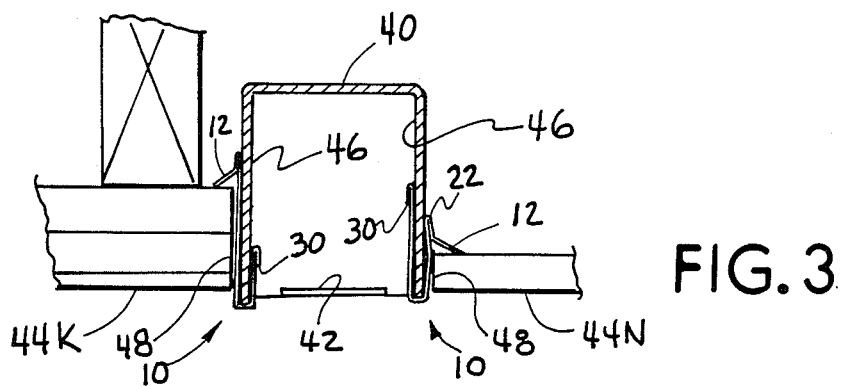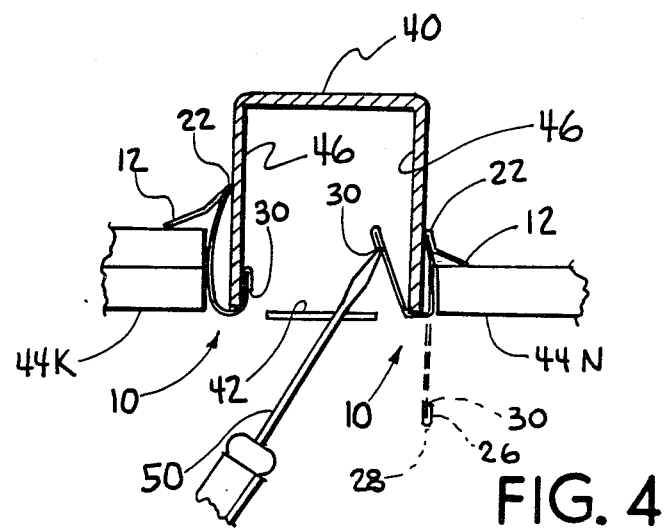

ELECTRICAL BOX RETAINER

BACKGROUND OF OF THE INVENTION

1 FIELD OF THE INVENTION

This invention pertains to a retainer for holding an electrical box, such as an outlet or a switch box, into a wall.

2. THE PRIOR ART

There is a definite need for a low cost general purpose retainer for holding electrical boxes into walls. Electrical boxes used to be all metal, but are now offered in sheet metal, thermoset plastic, fiberglass, and die cast metal. There is quite a diversity of outlet boxes on the market and they are used for open sheated wiring, flexible conduit, and rigid conduit wiring. There are quite a variety of walls that are commonly encountered, such as stud frame and sheet rock of ⅜ to 1 inch thickness, honeycomb panels, wall board, sheet metal, wood paneling, wood stripping, ceiling tile, and concrete blocks to name a few.

Installations of wiring after the walls have been built is a problem; it always has been. It can be very difficult to secure the box especially if it's alongside a stud or structural member. Then there are good reasons to have boxes removably installed. This is very difficult to do. There is a definite need for a single, low cost, small, interchangable and universal, easy to use box retainer that will work in virtually any wall, which will enable removal of the box, and which makes it easy to install a box in existing construction.

Specific examples of previous attempts made at box retainers include:

U.S. Pat. No. 2,736,450 by E. B. Atkinson, 2/28/56, a compression type barb requiring a full depth wall, a fairly precise fit of the box to the wall, and which is not removable. This device will not work in sheet rock, plaster or wallboard. Atkinson has a preformed spring clip that must be made of heavy steel, or else spring steel that has post forming heat treatment. The retainer clip of Atkinson exerts considerable lateral pressure upon the wall and would destroy gypsum board. It appears that the only use for Atkinson is in concrete, brick, solid wood, or metal structures.

U.S. Pat. No. 2,842,281 by H. A. Chisholm, 7/8/58, a spring loaded resilient double detent type of device permanently mounted to a box, works only on a specific thickness of wallboard and will not go against a stud. The box has some free transverse float in the wall after installation. This will not work in varying thickness walls.

U.S. Pat. No. 3,268,189 by J. N. Duchane, 8/23/66, a relatively large bracket for a specific thickness of wallboard, it will not go up against a stud and is quite bulky. It requires precision fitting of the box to a wall opening or the box can move transversely in the opening. This device will not work in paneling or plaster.

U.S. Pat. No. 3,424,332, by D. Pimentel, 1/28/69, has a foldable L-shaped clip for pulling a box cover against the backside of a wall. The clip is unique to the specific cover for which it is intended.

U.S. Pat. No. 3,860,139, A. French et al, 1/14/75, a resilient detent like Chrisholm, which only works in a precise thickness wall and does not give lateral fixing of the box to the wall.

U.S. Pat. No. 4,226,393, J. A. Rardin et al, 10/7/80, a screw together multiple piece assembly of at least three parts to hold a box in a wall. This device is selectively intended for a very small range in wall thickness, requires a relatively precise large opening to be made in a wall. this device is also useable only on a matched box.

U.S. Pat. No. 2,454,119, E. R. Atkinson, 11/16/48, is a one piece electrical box retainer that is slipped in along side of a box. This device does not provide for pulling of the retainer taunt against the wall or for tightening the box in the wall; the box has to be firmly pressed into the wall while the fingers of this device are bent into the box. This device has no provision to make the box rattle free and securely mounted without being sloppy in the wall.

OBJECTS OF THE INVENTION

It is an object of the invention to provide a new and improved discrete and universal one-piece retainer for securing any one of a variety of electrical boxes into any one of a variety of walls.

It is an object of the present invention to provide one piece electical box retainers having a leading protrusion, a barb for almost any type of wall, and a multiple use outer end catch for fastening of the box.

It is an object of the present invention to provide a single piece electric box retainer having a hemmed over leading protrusion, a cantilevered barb, a two layered multiple use outer end flange, and a grasping catch between the outer end flange and a retainer shank.

It is an object of the present invention to provide a new method of installing and retaining an electrical box in a wall using a discrete box retainer.

It is an object of the present invention to provide a new method of making a universal electrical box retainer out of soft sheet metal.

SUMMARY OF THE INVENTION

According to the principles of the present invention, an electrical box retainer of a contiguous piece of sheet metalhas an elongate planar shank, a leading protrusion and a cantilevered barb, and a multiple use catch on an outer end of the retainer.

An electrical box retainer of thin soft sheet metal has structure for abutting against the back side of a wall, an elongate shank, and a catch on an outer end of the shank, the catch is for pulling the retainer taut against the wall and for driving the outer end into and against the box.

An electrical box retainer of a single contiguous piece of soft sheet metal has an elongate planar shank, a two layered leading protrusion with a rounded nose, a cantilevered barb extending transversely from the protrusion, a two layered multiple use flange on an outer end of the shank, and a fastening catch formed by the multiple use flange and the shank.

A method of installing and retaining an electricalbox in a wall has the steps of making anopening, pushing the box into the wall, inserting a leading protrusion and barb of a soft sheet metal retainer into the hole between the box and the wall, grasping the retainer by an outer end, pulling the retainer taut against the wall, and driving the outer end into the box against a wall of the box.

A method of making a universalelectrical box retainer has the steps of shearing a rectangular shaped piece of soft sheet metal, forming a barb, folding over a first end and the barb, and forming a two-layered protrusion in front of the barb, and forming a catch in a second and outer end of the retainer, the catch and the barb are both formed on the same side.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

BRIEF DESCRIPTION OF THE DRAWINGS

FIG. 1 is a perspective view of the preferred embodiment of a new and improved retainer for an electrical box;

FIG. 2 is a plan view thereof;

FIG. 3 is a sectional plan view of an electrical box retained in a wall by the retainers of FIG. 1; and FIG. 4 is a sectional plan view illustrating installation and retaining of an electrical box in a wall using the retainers of FIG. 1.

DESCRIPTION OF THE PREFERRED EMBODIMENT

According to the principles of the present invention, an electrical box retainer such as is shown in FIGS. 1 & 2 and generally indicated by the numeral 10, is formed of a single contiguous piece of soft sheet metal of about 0.015 inches (0.4 mm) thick, preferrably galvanized. The retainer 10 is fabricated from a rectangular blank of sheet metal sheared to about 0.75 inches wide by about 3.50 inches long; the length to width ratio is at least 3:1 and preferrably almost 5:1. The retainer 10 has a cantilevered barb 12 about ½ inch long formed over on a radius 14 at an angle in the range of fifteen to forty-five degrees; a preferred angle is in the range of twenty to twenty-five degrees. A two-layered leading protrusion 16 is made by forming over a ¼ inch long second layer 18 and folding or hemming it tightly against an elongate, generally flat and planar shank 20. The protrusion 16 is flattened and a leading nose 22 is rounded but has a thickness which is less than 2.5 times the thickness of the sheet metal. The front or leading half 24 of the protrusion 16 is spanked flat and work hardened to give a hardened round nosed leading protrustion 16 that can be driven into a wall; the part of the second layer 18 and all of the barb 12 remains virtually soft. The protrusion 16 is the leading end of the retainer 10.

An outer end of the retainer 10 has a formed over second layer multiple-use flange 26 which is flattened and hemmed against the shank 20. This outer end flange 26 is about 3/16 inch long and has its outer half spanked flat. An outer end radiused heel 28 has a thickness of less than 2.5 times the thickness of the sheet metal, and which is work hardened enabling the heel to be hit with a hammer without significant deformation. A forward facing edge of the outer flange 26 is abutted against the shank 20 jointly forming a grasping catch 30 usable for and in a method of installation to be explained. The catch 30 is on the same side of the shank 20 as in the barb 12 and protrusion second layer 18. The catch 30 is spaced from the barb 12 by a centrallength 32 of a shank 20, a distance which is more than half or a majority of the length of the retainer 10. A preferred spacing has been found to be about 1⅝ inches on a 2 9/16 inch long retainer 10. This particular combination will work on most walls commonly encountered. The barb 12 acutely and obliquely extends rearward of the protrusion 16 and transversely outward from the shank 20 at an angle in the range of 15 to 45 degrees; a preferred angle is in the range of 20 to 25 degrees. The barb 12 is longer than the protrusion second layer 18 which provides for inward resilient depression of the barb 12. The barb 12, protrusion 16, shank 20, heel 28 and catch 30 are all of the same width.

FIG. 3 shows an electrical box 40 having its upper and lower ears 42 abutted against a wall. The retainer 10 works with either a thin wall 44N or a thick wall 44K; it makes no difference, the shank central length 32 is folded over the electrical box wall 46 and the outer end flanges 26 are folded against the shank then folded inside the electrical box 40.

FIG. 4 is an illustration of the steps of the new method of installing and retaining the electrical box 40 in the wall 44. An aperture 48 has been cut in the wall 40; the correct size aperture 48 may be traced around the perimeter of the electrical box 40. The electrical box 40 is pushed into the wall 40 through the aperture 48. The leading protrusion 16 and barb 12 of a retainer 10 are then pushed through the aperture 48 between the electrical box 40 and the wall 44 until the barb 12 has cleared the backside of the wall 44. During insertion of the barb 12, the barb 12 resiliently flattens against the shank 20 by bending of the back half of the second protrusion layer 18, the radius 14, and the barb 12. The protrusion 16 and barb 12 are pushed through by palm pressure upon the heel 28; the rounded heel 28 will not cut, scratch or tear gloves, and it can be driven with a tool if need be. This is one of the uses of the flanges 26. After the barb 12 is through, it extends itself back out. The thin width of the hardened rounded nose 22 leads the barb 12 through. The catch 30 is then grasped either manually or with a pliers and the retainer 10 is pulled taut against the back of the wall 44. That is another of the uses of the flange 26; it enables secure and confident grasping by hand or by a pliers. When the retainer 10 is pulled taut with a pliers, the barb 12 is opened up by gradual spreading and bending of the shank 20 rearward of the hardened section 24, as well as that part of the protrusion second layer 16 rearward of the hardened section 24, and the radius 14 and the barb 12. The shank 20 tends to arch outward and the electrical box 40 is transversely jammed in the aperture 48 so there is no lateral movement. The retainer 10 then has its centrallength 32 folded over the electrical box wall 46 by thumb pressure upon the rounded heel 28; this is another use for the flange 26. Then a screwdriver or appropriate tool 50 is placed into the catch 30, and the catch 30, heel 28 and outer end flange 26 are all driven into the electrical box 40 tightly up against its wall 46. After another retainer 10 is installed on the outer side of the electricalbox 40, the box 40 is installed and retained in the wall 44. The outlet or switch and wires can now be placed in the electrical box 40, and when pulled out for service or rework, the rounded heel 28 prevents cutting or scraping of insulation.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. An improved electrical box retainer of a contiguous single piece of relatively thin and soft sheet metal, said retainer having:

(a) an elongate and rectangular generally flat and planar shank;

(b) a leading protrusion on a first and front end of the shank, said protrusion having a nose and a barb;

(c) said nose being upon the shank and being formed by an outside flange folded over and flattened against a portion of the shank, said nose being flattened to a total thickness of less than 2.5 times the thickness of the shank;

(d) said barb being cantilevered and extending rearward and transversely outward from the back of the nose outside flange;

(e) a multiple use catch on an outer and second end of the shank, said of the shank catch being on the same side as the barb and spaced rearward of the barb by a central and elongate length of the shank, said central length being a majority of the length of the retainer.

2. The improved electrical box retainer of claim 1, in which the catch is formed by a forward facing edge of a catch flange folded over and flattened against the shank on the same side of the shank as the nose flange and barb.

3. An improved electrical box retainer of a single piece of relatively thin and soft sheet metal, said retainer having:

(a) means for abutting and holding against the back side of a wall immediately adjacent to an electrical box installed in the wall;

(b) an elongate shank having a first and forward end for extending through the wall immediately alongside the outside of the box;

(c) a catch on a second and outer end of the shank for firstly pulling the retainer taunt against the wall backside and secondly driving the outer end of the shank into the box while tightening the box in the wall, said catch beng spaced fromsaid abutment by a majority of the length of the shank and being a forward facing edge of a folded over and flattened hemmed flange on the uter end of the shank, said flange and said abutting means both being folded on the same side of the shank and away from the box, said flange edge facing toward the abutting means.

4. An improved electrical box retainer of a single contiguous piece of relatively thin and soft sheet metal, said retainer having:

(a) a elongate and rectangular generally flat and planar shank;

(b) a two-layered hemmed over leading protrusion having a folded over second layer parallel to and against a leading end of the shank, and a rounded nose defining a front end of the retainer;

(c) a cantilevered barb acutely oblique to the shank, said barb extending transversely from a back end of the protrusion second layer and transversely rearward along a central length of the shank;

(d) a two layered multiple use catch flange having a second layer parallel to and flattened against the shank on the same side of the shank as the protrusion second layer, and a rounded end defining an outermost heel of the retainer;

(e) a catch between a front end of the multi-use flange and the shank, said catch being on the same side of the shank as the barb, said catch being spaced from the barb a majority of the length of the retainer;

(f) in which the barb, the multiple use catch flange and the catch all have an identical width;

(g) in which the two layered protrusion is flattened, said rounded nose having a thickness of less than 2.5 times the sheet metal thickness;

(h) there being a small radius between the barb and the protrusion second layer;

(i) in which the barb is longer than the protrusion, and is at a divergent angle in the range of 20-40 degrees from the shank; and (j) in which the multiple use catch flange is flattened against the shank, the front end of the multiple use catch flange being an abuttment immediately adjacent to the shank and being part of the catch.

* * * * *